(12) United States Patent
O'Gorman et al.

(10) Patent No.: US 11,926,243 B2
(45) Date of Patent: Mar. 12, 2024

(54) CONFIDENCE-BASED VEHICLE CHARGE CONTROL

(71) Applicant: Ford Global Technologies, LLC, Dearborn, MI (US)

(72) Inventors: Ryan J. O'Gorman, Beverly Hills, MI (US); Devang Bhalchandra Dave, Ann Arbor, MI (US); Farshad Harirchi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 708 days.

(21) Appl. No.: 17/014,641

(22) Filed: Sep. 8, 2020

(65) Prior Publication Data

US 2022/0072975 A1    Mar. 10, 2022

(51) Int. Cl.
*B60L 58/13* (2019.01)
*B60L 15/20* (2006.01)
*B60L 50/64* (2019.01)
*B60L 53/00* (2019.01)
*G01C 21/34* (2006.01)

(52) U.S. Cl.
CPC ........... *B60L 58/13* (2019.02); *B60L 15/2045* (2013.01); *B60L 50/64* (2019.02); *B60L 53/00* (2019.02); *G01C 21/3469* (2013.01)

(58) Field of Classification Search
None
See application file for complete search history.

(56) References Cited

U.S. PATENT DOCUMENTS

| | | | |
|---|---|---|---|
| 8,615,355 B2 | 12/2013 | Inbarajan et al. | |
| 9,610,853 B1 | 4/2017 | Miller et al. | |
| 9,821,675 B2 | 11/2017 | Geo | |
| 2015/0175026 A1* | 6/2015 | Uyeki | B60L 53/18 320/109 |
| 2017/0088000 A1* | 3/2017 | Payne | B60L 53/64 |
| 2017/0120761 A1* | 5/2017 | Kapadia | G07F 15/005 |
| 2018/0045526 A1 | 2/2018 | Trancik et al. | |
| 2020/0307405 A1* | 10/2020 | Waardenburg | B60L 53/64 |

* cited by examiner

*Primary Examiner* — Adam D Tissot
*Assistant Examiner* — Garrett F Evans
(74) *Attorney, Agent, or Firm* — David B. Kelley; Brooks Kushman P.C.

(57) ABSTRACT

A vehicle comprising includes a traction battery and a controller. The controller, responsive to an interval exceeding a predefined threshold and a predicted net loss in energy, charges the traction battery such that the traction battery acquires energy in an amount at least equal to the predicted net loss in energy. The interval defines a confidence level that a predicted net change in energy stored by the traction battery will occur as a result of use of the vehicle between a current charge location of the vehicle and a next charge location of the vehicle. The amount is based on the interval such that the amount increases as the interval decreases.

12 Claims, 3 Drawing Sheets

CONFIDENCE-BASED VEHICLE CHARGE CONTROL

TECHNICAL FIELD

This application relates to electrified vehicle charging.

BACKGROUND

Electrified vehicles may include a rechargeable high-voltage battery to provide power to the propulsion system as well as other vehicle systems. In cases where the battery is recharged using power from the electrical grid, the other vehicle systems may rely on power from the grid as opposed to draining battery power. Also, such vehicles may be connected to a network and receive information about scheduled user events that affect an expected conclusion of a charge procedure.

Pricing of electricity can vary by location, time of day, availability (i.e., supply), and consumption (i.e., demand). Related to consistency associated with petrol fuel pricing, few sources provide infrastructure and distribution networks for gas stations. Comparatively, infrastructure for electricity is more commonplace and varies widely geographically with a larger number of smaller companies providing electric charging. The differences in infrastructure introduce greater variability in the prices for electric vehicle charging. Moreover, electric recharging requires more time compared to refueling petrol fuel.

SUMMARY

A vehicle includes a traction battery and a controller. The controller, responsive to an interval exceeding a predefined threshold, wherein the interval defines a confidence level that a predicted net change in energy stored by the traction battery will occur as a result of use of the vehicle between a current charge location of the vehicle and a next charge location of the vehicle, and the net change being negative, charges the traction battery such that the traction battery acquires energy in an amount at least equal to the predicted net change in energy. The amount is based on the interval such that the amount increases as the interval decreases.

A method for charging a vehicle includes, responsive to an interval exceeding a predefined threshold, wherein the interval defines a confidence level that a predicted net change in energy stored by a traction battery of the vehicle will occur as a result of use of the vehicle between a current charge location of the vehicle and a next charge location of the vehicle, the net change being negative, and an energy cost at the current charge location being greater than an energy cost at the next charge location, charging the traction battery such that the traction battery acquires energy in an amount at least equal to the predicted net change in energy. The amount is based on the interval such that the amount increases as the interval decreases.

A vehicle includes a traction battery and a controller. The controller, responsive to an interval exceeding a predefined threshold, wherein the interval defines a confidence level that a predicted net change in energy stored by a traction battery of the vehicle will occur as a result of use of the vehicle between a current charge location of the vehicle and a next charge location of the vehicle, the net change being negative, and a source of energy at the current charge location being identified as fossil fuel and a source of energy at the next charge location being identified as green, charges the traction battery such that the traction battery acquires energy in an amount at least equal to the predicted net change in energy. The amount is based on the interval such that the amount increases as the interval decreases.

DETAILED DESCRIPTION

Figure 1:
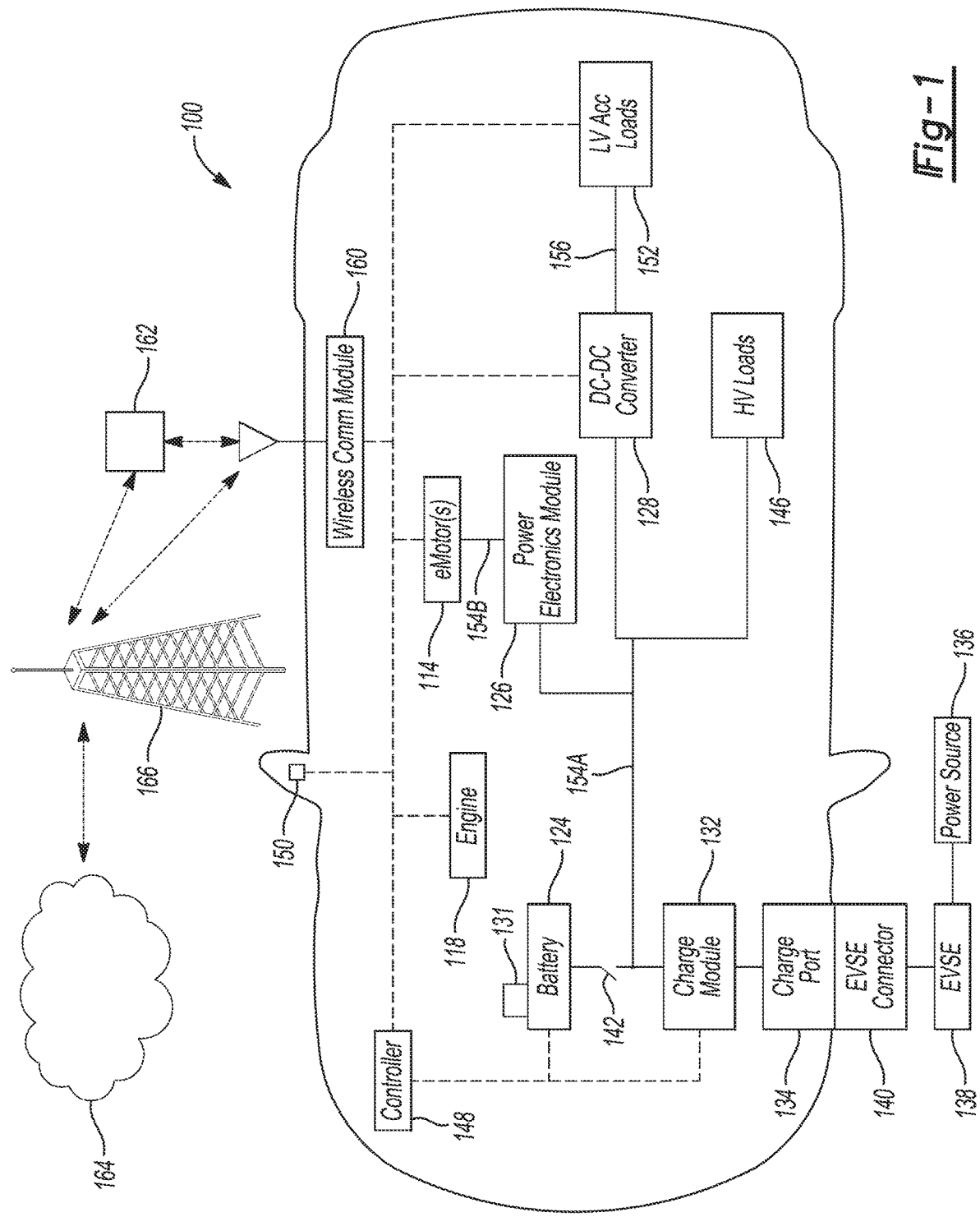
FIG. 1 is a schematic of a vehicle with an electrified propulsion system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The introduction of real-time electric energy billing, time-of-day billing, and seasonal billing may have made manual scheduling of charging electric vehicles complicated. In addition to manual plug and unplug actions by a user, certain vehicles may offer preset charging schedules for at-home charging or other preferred locations. In these cases, the scheduled charging may remain effective until a user modifies the schedule. However, actual charging availability is driven by the vehicle's user routine and is subject to change over time. It may be common for users to perform a majority of vehicle charging at a home location. However, as the charging infrastructure offers increased options for low-cost and free vehicle charging, a larger portion of charging may occur away from the home location and at workplaces and in public vehicle charging hot spots. It may be difficult for users to search for and compare charging cost at different public charging locations, and then optimize their charging behavior to take best advantage of low-cost opportunities. This optimization becomes even more complex considering dynamic energy pricing described above.

Because it may be difficult to manually create a charging schedule that fully takes advantage of low-cost opportunities, smart charging systems that have the ability to do so is likely of great advantage to an electric vehicle (EV) user. A smart charging system (SCS) is a charging system that may employ historical vehicle data as well as third-party data from remote sources to manage charging while requiring minimal or no planning input from a user. The SCS may utilize these data sources to identify the routine vehicle behaviors and user preferences and automatically schedule charging. The SCS may forecast expected regenerative energy gains and consumption to minimize the total cost of used energy for charging. The minimization of the cost of charging energy is performed while still satisfying all vehicle energy consumption requirements.

As stated previously, the SCS may predict the expected energy consumption and regenerative gains for an EV. This may allow the SCS to calculate the target state of charge each time the battery is charged, likely ensuring that the vehicle only leverages the capacity in the battery that is necessary for taking advantage of energy cost savings while still ensuring that the vehicle has sufficient energy to successfully travel to subsequent plug-in destinations. Several current solutions exist for making this energy prediction and thereafter, deciding the amount of energy to supply to a traction battery for charging. These current solutions utilize several interdependent factors as direct inputs to the predictor such as origin, destination, ambient temperature, etc., and if any of the factors deviate from the prediction, the predictor may not be accurate.

The proposed techniques, however, are not dependent on individual trip characteristics. Instead by way of example, a controller system may identify an EV user's routine charge locations using historical vehicle data, predict the net energy consumption between a current charge location and a next routine charge location using the historical vehicle data, and establish a confidence interval that the predicted net change in energy will occur as a result of use of the vehicle between the current charge location of the vehicle and the next routine charge location of the vehicle.

Multiple trips may take place between routine charge locations. An EV user may routinely charge at work weekday mornings and at home weekday evenings. This same user, however, may make multiple and different stops while travelling between work and home. Some of these stops may occasionally include charging at spur of the moment locations. Such charge events would not be deemed routine.

The proposed controller system does not attempt to sum a series of energy consumption predictions for each trip, stop, and charging events. Rather, it packages data between each routine charge location and is independent of specific trip data. Depending on the confidence level, which is based on whether the vehicle user is following a routine, the controller system will determine an appropriate amount of energy with which to charge the vehicle's traction battery. Additionally, in some examples, the controller system may also allow the user to enter various parameters that will be prioritized. These parameters include using more green energy, minimizing the energy cost for charging, and/or minimizing the time of charge. Weighing the confidence in its future net energy prediction and the user's charging preferences, the controller system may calculate the amount of energy with which to charge a vehicle's traction battery.

FIG. 1 depicts a plug-in hybrid-electric vehicle (PHEV) 100. The PHEV 100 includes an electrified propulsion system having one or more electric machines 114 mechanically coupled to a hybrid transmission (not shown). Each of the electric machines 114 may be capable of operating either as a motor or as a generator. In addition, the hybrid transmission is mechanically coupled to an internal combustion engine 118. The electric machines 114 are arranged to provide propulsion torque as well as slowing torque capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the PHEV 100 may be operated in an electric-only drive mode using the electric machines 114 as the sole source of propulsion. The hybrid transmission is also mechanically coupled to road wheels to output torque from the electric machines 114 and/or combustion engine 118. While the topology of hybrid vehicle 100 is provided by way of example, aspects of the present disclosure may be applicable to any vehicle having an electrified propulsion system. Specifically, any electrified vehicle capable of receiving power from a power grid, such as battery electric vehicles (BEV's), may benefit from the charging control systems and methods contemplated herein.

A chargeable energy storage system is provided as battery pack 124 that stores energy to power the electric machines 114 and other vehicle electrical loads. The battery pack 124 typically provides a high-voltage direct current (DC) output from one or more battery cell arrays, sometimes referred to as battery cell stacks, within the traction battery 124. Each battery cell array may include one or more battery cells. The battery cells, such as a prismatic, pouch, cylindrical, or other types of cells, are used to convert stored chemical energy to electrical energy. The cells may include a housing, a positive electrode (cathode) and a negative electrode (anode). An electrolyte allows ions to move between an anode and cathode during discharge, and then return during recharge. Terminals may allow current to flow out of the cell for use by the vehicle. Different battery pack configurations may be available to address individual vehicle variables including packaging constraints and power requirements. The battery cells may be thermally regulated by a thermal-management system. Examples of thermal-management systems include air cooling systems, liquid cooling systems and a combination of air and liquid systems.

One or more contactors 142 may selectively isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 100 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., a 12-volt battery). The low-voltage loads 152 may be electrically coupled to the low-voltage bus 156. The low-voltage loads 152 may include various controllers within the vehicle 100.

The traction battery 124 of vehicle 100 may be recharged by an off-board power source 136. The off-board power source 136 may be a connection to an electrical outlet. The external power source 136 may be electrically coupled to a charging station or another type of electric vehicle supply equipment (EVSE) 138. The off-board power source 136 may also be an electrical power distribution network or grid as provided by an electric utility company. The EVSE 138 provides circuitry and controls to regulate and manage the transfer of energy between the power source 136 and the vehicle 100. The off-board power source 136 may provide DC or AC electric power to the EVSE 138. The EVSE 138 includes a charge connector 140 for plugging into a charge port 134 of the vehicle 100. The charge port 134 may be any type of port configured to transfer power from the EVSE 138 to the vehicle 100. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 100. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

When the vehicle 100 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

The traction battery 124 may also have one or more temperature sensors 131 such as thermistors or other types of temperature sensors. The temperature sensor 131 may be in communication with the controller 148 to provide data indicative of temperature of the battery cells. The vehicle 100 may also include temperature sensor 150 to provide data indicative of ambient air temperature. In the example schematic of FIG. 1, the temperature sensor 150 is disposed in a vehicle side mirror, but it should be appreciated that the temperature sensor may be located anywhere on the vehicle suitable to detect ambient temperature.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include compressors and electric heaters related to the vehicle climate control system 158. For example, the vehicle climate control system may draw high-voltage loads in the range of 6 kW-11 kW under high cooling loads. According to some examples, the rechargeable battery 124 supplies powers at least a portion of the climate control system 158.

The vehicle 100 further includes at least one wireless communication module 160 configured to communicate with external devices, over a wireless network. According to some examples, wireless communication module includes a BLUETOOTH transceiver to communicate with a user's remote device 162 (e.g., cell phone, smart phone, PDA, or any other device having wireless remote network connectivity). The remote device 162 can in turn be used to communicate with a network 164 outside the vehicle 100 (i.e., the "cloud") through, for example, communication with a cellular tower 166. In some examples, tower 166 may be a WiFi access point. Data provided to the wireless communication module 160 may be passed to other vehicle modules that control functions related to battery charging. Since the vehicle is equipped with the wireless communication module for telematics and other purposes, there is no need for additional hardware to the system according to examples of the present disclosure. In specific examples, one or more control modules may use data transmitted from a remote utility provider for charging system control and to adjust charging patterns.

Data may be communicated between the wireless communication module 160 and a remote network utilizing, for example, a data-plan, data over voice, or DTMF tones associated with the remote device 162. Alternatively, the wireless communication module 160 may include an onboard modem having antenna in order to exchange data with the network 164 over the voice band. According to some examples, the controller 148 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In further example, remote device 162 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can utilize the entire bandwidth. Further data transfer protocols may also be suitable according to aspects of the present disclosure, for example, such as Code Domain Multiple Access (CDMA), Time Domain Multiple Access (TDMA), and Space-Domain Multiple Access (SDMA) for digital cellular communication.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

System controller 148, although represented as a single controller, may be implemented as one or more controllers. In some examples, multiple controllers located on the vehicle cooperate to perform algorithms discussed herein. In other examples, the controller or portions of the controller may be located on a server external to the vehicle. In additional examples, a central fleet server collects aggregate data from a plurality of vehicles to enhance confidence regarding predicted user behavior, cost trends, charging rates, and/or other variables influencing charging. In further examples, the controller or portions of the controller may be located at a charging station and regulate charging events based on data transmitted from the vehicle or other sources.

The controller 148 may monitor operating conditions of various vehicle systems. According to the example of FIG. 1, at least the electric machines 114, engine 118, traction battery 124, DC-DC converter 128, charging module 132, and high-voltage loads 146, low-voltage loads 152, and wireless communication module 160 are in communication with the controller 148.

The controller 148 also generally includes any number of subcomponents such as microprocessors, ASICs, ICs, memory (e.g., FLASH, ROM, RAM, EPROM and/or EEPROM) and software code to co-act with one another to perform various operations. The subcomponents allow onboard processing of commands and execute any number of predetermined routines according to a desired timing or alternatively in response to one or more inputs received from vehicle systems. The processors may be coupled to non-persistent storage and/or persistent storage. In an example configuration, the non-persistent storage is RAM, and the persistent storage is flash memory. In general, persistent (non-transitory) storage can include all forms of storage that maintain data when a computer or other device is powered down. The controller 148 may also store predetermined data within the memory, such as "look up tables" that are based on calculations and/or test data. The controller communicates with other vehicle systems and sub-controllers over one or more wired or wireless vehicle connections and may use common bus protocols (e.g., CAN and LIN). Used herein, references to "a controller" refer to one or more controllers.

The traction battery 124 includes a current sensor to output a signal indicative of a magnitude and direction of current flowing into or out of the traction battery 124. The traction battery 124 also includes a voltage sensor to sense a voltage across terminals of the traction battery 124. The voltage sensor outputs a signal indicative of the voltage across the terminals of the traction battery 124. The traction battery 124 may also have one or more temperature sensors 131 such as thermistors or other types of temperature sensors. The temperature sensor 131 may be in communication with the controller 148 to provide data indicative of temperature of the battery cells.

The current sensor, voltage sensor, and temperature sensor outputs of the traction battery 124 are all provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

A desired temperature operating range may also be specified for the traction battery. The temperature operating range may define upper and lower thermal limits within which the battery 124 is operated. Battery temperature may affect changing and/or energy depletion rates. In response to a sensed temperature approaching a thermal limit, operation of the traction battery 124 may be modified or other mitigation actions may be initiated to actively regulate temperature. According to some example configurations, the traction battery 124 as well as other vehicle components are thermally regulated with one or more thermal-management systems.

Discussed in more detail below, the charge module 132 may be operated based on one or more algorithms stored at the controller 148. According to some examples, the charge module 132 is operated to opportunistically charge the vehicle battery based on past vehicle usage routines and expected upcoming vehicle usage.

Figure 2:
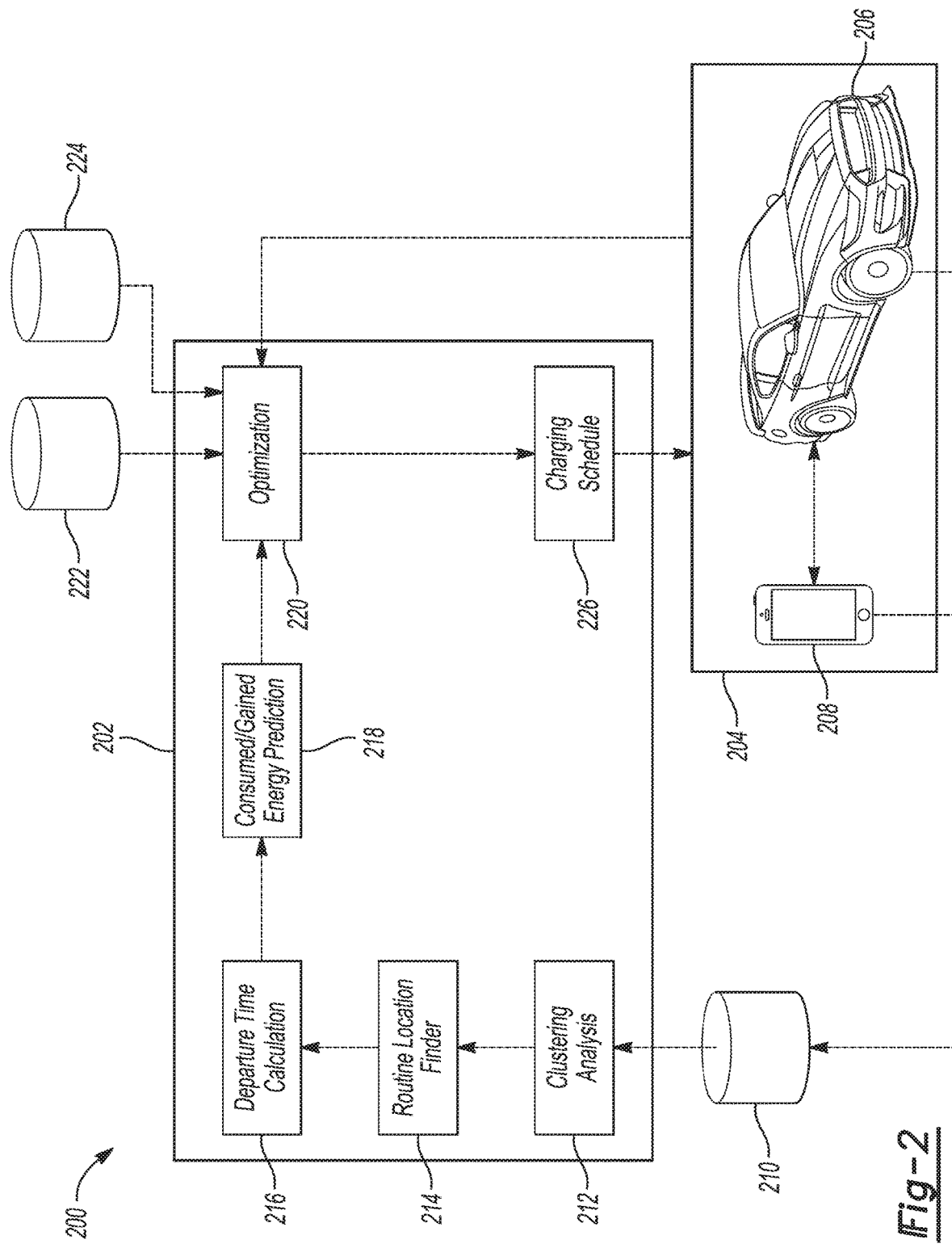
FIG. 2 is a system diagram of a smart charging system.

Referring to FIG. 2, a schematic system diagram represents an example architecture for a smart charging system (SCS) 200. The SCS 200 performs a routine that accounts for how long a user plugs in a vehicle at a location where charging regularly occurs with some degree of confidence. The SCS 200 performs a predictive routine by utilizing known usage patterns to identify the best opportunities to charge within that routine. These charging opportunities include times the vehicle is plugged in or connected to a charging source, along with other factors related to that source including but not exclusive to cost, power source, and rate of charge.

The SCS 200 also considers how much energy is consumed between routine plug-in locations. The SCS 200 further calculates the vehicle energy needed to complete trips based on trip characteristics and external factors that influence energy consumption, such as temperature. Other objective factors can be optimized based on user preferences, data from third parties, or set by the algorithm. These objective factors may include using green energy, minimizing the energy cost for charging, and/or minimizing the time of charge. These objective factors may be used to make decisions regarding charging events such as selecting location, timing, duration, rate of charge, etc.

The SCS 200 also determines a degree of regularity, or routineness, about charging events based on historical vehicle data, confidence of an upcoming plug-in weighted based on time at particular latitude and longitude. The degree of routineness can also influence decisions regarding anticipated tolerances of a customer routine related to the regularity in which a customer follows a particular routine. Charging events will be adjusted within charging opportunities to improve customer outcomes related to their set of objectives and still meet needs of the given vehicle's routine.

A smart charging algorithm 202 includes logic to control charging routines based on a number of various inputs. The smart charging algorithm 202 takes as inputs past charging event patterns that may be unique to the particular user and/or vehicle. The vehicle system 204 may include charging indicators output from each of the vehicle 206 and a user mobile device 208. Since an individual user may have multiple vehicles, and an individual vehicle may have multiple drivers, the smart charging algorithm 202 may consider unique characteristics about the combination of vehicle 206 and mobile device 208 as a vehicle system 204 as criteria for controlling charge protocols. According to some examples, the historical charging and depletion data is grouped by a user-vehicle combined set that may be signaled by a user mobile device detected in a proximity of the vehicle.

The vehicle system 204 outputs data that provide characteristics of past, present, and planned charge events. Historical vehicle data 210 may be stored in memory at the vehicle 206, at the user mobile device 208, at the charge station (not shown), an off-board server, or other suitable storage location for recall to influence future charge events. According to some examples, the controller is programmed to receive data indicative of historical charging and depletion patterns.

A plug-in event may be defined by the time at which the plug-in charging initiates through the time at which the vehicle registers as unplugged from the charge station. The start and stop indicators of a plug-in event may or may not coincide with when the vehicle arrives at or departs from a given location. While "plug-in" is used herein by way of example, it should be appreciated that other charging mechanisms such as non-contact charging (e.g., inductive charging) fall within the scope of the present disclosure.

The location of the plug-in event is also stored as part of past charge event data. The plug-in location may include the latitude and longitude coordinate pair where the plug-in event is registered by the vehicle, which may or may not coincide with a particular charging event.

A routine plug-in event is a regularly-occurring plug-in event having a confidence interval regarding routineness such that a routineness value is above some predefined confidence threshold. The routineness value may include any combination of indicators of likely charge occurrence. In some examples the routineness value is based on at least one of a charge event frequency, charge event duration, each for a particular plug-in charging location. In this way, certain plug-in events may not be applicable as a routine plug-in event. For example, charging at certain locations where the vehicle and/or user has not registered a sufficient number of previous plug-in events may not qualify as a routine plug-in event.

The SCS 200 may further be configured to incorporate data from non-routine plug-in events to improve the confidence in predicting expected user behavior and energy consumption. For example, routineness values may be applied across a range of likeliness of occurrence. An event having a greater routineness value, even if not designated as "routine," may still influence the expected energy consumption predictions greater than events with lesser routineness values.

Historical vehicle data 210 is provided to a clustering analysis subroutine 212 to determine patterns regarding the stored vehicle charging data. The clustering analysis subroutine 212 detects natural partitioning of data points of charging events to establish charging event groups based on common characteristics. That is, vehicle data can be aggregated and analyzed by algorithms stored at one or more controllers to reveal patterns associated with charging and usage. A vehicle routine is made up of a series of trips (durations of travel, time and routes) and includes expected stops (location where customer charges regularly and the durations of plug-in times). According to some examples, a plug-in routine is defined as a predetermined number of routine plug-in events based on data point proximity to a group of similar data points in a cluster.

A routine location finder subroutine 214 is provided to identify preferred charging locations that may be available at the times and locations associated with expected plug-in events.

A departure time calculation subroutine 216 is provided to identify the time when the vehicle is expected to depart from a given location. For example, departure time may be based on a typical departure to or from an employment location or trips having a repetitive pattern.

An energy prediction subroutine 218 is provided to estimate the energy gained (e.g., via charging and generation) and/or the energy depleted (e.g., via driving, etc.) during the group of expected plug-in events comprising the plug-in routine. The energy prediction subroutine 218 calculates the net energy consumed between every two adjacent routine plug-in events. This net energy consumed includes any energy that enters or exits the vehicle energy storage unit during the upcoming plug-in routine (e.g., energy used to move the vehicle, energy used to heat or cool the vehicle, energy generated by the vehicle during driving, or energy gained through charging during the previous individual plug-in event). An energy prediction routine can also be found as a component of FIG. 3.

An optimization subroutine 220 takes input from each of the energy prediction subroutine 218, third-party data sources 222 (e.g., utility company pricing data, charge station power ratings, etc.), direct customer input 224, and real-time data from the vehicle system 204. The plug-in routine optimization subroutine 220 optimizes the intake energy profile based on the expected utilized cost over several expected plug-in events beginning from current time and moving into the future.

The optimization subroutine 220 outputs a preferred charging schedule 226 for an upcoming plug-in routine. Each of a smart charging schedule, an upcoming departure time, and a set of target SOC values is included in the preferred charging schedule 226. The group of expected routine plug-in events is bounded within the vehicle's overall plug-in routine, which may be defined by the expected plug-in events combined with the overall energy consumption. In some examples, the preferred charging schedule 226 is independent of user and is instead specific to each individual vehicle and updates real-time on an ongoing basis. The optimization subroutine executes within plug-in routine behavior of the vehicle and does not impose any changes to a user's expected behavior. That is, optimization subroutine 220 is configured to be fully seamless with respect to patterned customer usage.

The optimization subroutine 220 receives real-time data input from the vehicle 204 indicative of the actual driving and/or charging and compares the real-time data to the expected routine behavior. In cases where a routine plug-in event and/or energy consumption deviate from the expected routine, the optimization subroutine 220 is configured to automatically adjust to maintain maximum customer usability. For example in cases when a plug-in routine is not identified for a predefined period of time (e.g., 24-48 hours), or when a plug-in event occurs that is not identified as an expected routine plug-in event, then the optimization subroutine 220 may cause the vehicle to charge to the maximum SOC that is feasible during the next available plug-in event with a target SOC of full capacity of the vehicle's energy storage unit. In this way, the optimization subroutine 220 recognizes excursions in expected patterned behavior and automatically adjusts real-time to provide optimal charging while still maintaining expected vehicle usage capability. According to some examples, the controller is programmed to receive and monitor real-time vehicle usage data. In other examples, the controller is programmed to, in response to detecting a vehicle usage event outside of the upcoming plug-in routine, set a target SOC to a maximum SOC for a next-available routine plug-in event.

The third-party data sources 222 inform the optimization subroutine 220 and may include data such as charge rates over an expected routine plug-in event, availability and scheduling of charge locations along the upcoming routine plug-in event, and time windows of charging availability over the upcoming routine plug-in event. The controller is programmed to receive data indicative of third-party charging parameters. In some cases, the controller actively requests such data over a wireless network. In other cases, the charge system may broadcast real-time charging parameters to each vehicle in a vicinity of the charge system.

The optimization subroutine 220 calculates a cost profile for each routine plug-in event based on the price of energy, the amount of green energy available, the time of day, and duration of charge time, etc. In some examples, the cost profile may be either static or dynamic. The optimization subroutine 220 is configured to plan charging when the utilized cost profile is lower, and in turn prioritize lower cost periods within routine plug-in events across all future predicted routine plug in events.

The direct customer input 224 informs the optimization subroutine 220 and may include user charging preferences regarding charging that cause a weighting of certain charge parameters. For example, the direct customer input 224 may include indication of a user preference to charge, or not to charge, at a known user workplace where charging is of little or no cost to a user. In other examples, the user may input other user-specific information that bears on charging. Specifically, the user may input the presence and/or rating information for energy-assist devices such as solar panels at a user home. The presence of such energy-assist devices and their corresponding output may reduce charging cost at such locations and thus skew a desired charging schedule. Conversely, the user preferences may be set to minimize charging cost at a user's home altogether where full power costs may be attributable directly to the user.

The preferred charging schedule 226 may be for the next routine plug-in event, or encompass a number of upcoming events (i.e., a plug-in routine). The preferred charging schedule 226 includes a target SOC as the desired state of charge at the conclusion of each routine plug-in event included in the charging schedule. According to some examples, the target SOC is determined by a predicted energy consumption due to drive events between routine plug-in events. This may include energy consumption during travel between locations along the plug-in routine, and factor in other energy consumption factors such as temperature, traffic, user driving profile, etc. According to some examples the controller is programmed to set a target SOC for a given plug-in event based, at least in part, on the expected energy depletion ahead of a next subsequent plug-in event.

The target SOC may also be based on a customer-entered lower bound on target SOC at the end of any routine plug-in event. For example, a user may designate that SOC is not allowed to be depleted to less than a user comfort threshold (e.g., 40% SOC) in order to provide greater flexibility to accommodate driving deviations from the expected plug-in routine. In some specific examples, the lower bound on target SOC can be temporarily exceeded at certain times so long as the desired outcomes of the overall plug-in event routine are fulfilled.

The target SOC may further be based on a prioritization of the individual routine plug-in events. This prioritization may be composed of several factors, such as a routineness value, the rate of charge at the location of one or more routine plug-in events, or other factors. Certain locations may offer greater power availability and thus more rapid charging capability (e.g., charging at a residential home versus charging at a commercial charging facility). The charging rate may further be influenced by utility company scheduling (e.g., scheduled brownouts or other planned reductions in voltage of the electrical supply during times of high electrical demand). Thus, the controller may be programmed to assign a greater priority to routine plug-in events having more rapid recharge capability. According to some examples, third-party charging parameters are indicative of an available charging rate, and the controller is programmed to set a target SOC for a plug-in event based on minimizing a recharge time of the overall upcoming plug-in routine.

The prioritization of the individual routine plug-in events may additionally be based on the overall cost profile of the plug-in event. For example, lower cost plug-in events may be given a higher priority in the algorithms of the SCS 200 (e.g., no-cost charging at an employment location may be afforded greater priority over at-home charging where cost is attributed to the user). Thus, the controller may be programmed to assign a greater priority to routine plug-in events having a reduced cost profile relative to other known routine plug-in events. It should be appreciated that the duration of a given plug-in event may be greater than the actual time spent charging during the event. For example, a vehicle may be expected to remain plugged-in over night for eight hours, yet perform recharging for a lesser duration and only as required to support the preferred charging schedule. Moreover, the particular time selected within the routine plug-in event time window is also optimized based on reducing charging cost or other desired charging objectives. The third-party charging data may be indicative of charging energy cost, power ratings, and/or availability and these data are provided to the smart charging algorithm 202. The controller is programmed to set a target SOC for a plug-in event based on minimizing the charging energy cost of the overall upcoming plug-in routine.

Aspects of an example usage pattern may include a user parking and plugging in an electric vehicle for charging during business hours every workday of a week. Under this scenario, the vehicle is charging for some duration at a worksite where the charging is provided for free. The user may also plug in the same electric vehicle at a home location for charging during non-business hours, where standard rates for electricity apply. Without charging schedule optimization as provided herein, the vehicle may simply charge to the maximum available capacity during home charging and not take full advantage of potential opportunities to charge for free at the user's worksite. A more optimal behavior for the user is for the vehicle to reserve some capacity in the battery while charging at home, in order to fully leverage the free charging opportunity at worksite. However, for a user to manage the optimal charging events directly or remotely can be complicated. As discussed above, charging optimization may rely on multiple factors such as cost of charge, rate of charge, available charging time, etc. In a specific example case, workplace charging provided at a rate of 7 kW AC compared to public access charging provided at levels of 50 kW DC require significantly different amounts of time to charge. Charging at the public access site to a target SOC level may enable a full charge to be achieved at the workplace when the expected time window would not otherwise allow a full charge. Thus, optimization according to the present disclosure avoids the need for a user to manually manage a charging schedule which may not satisfy vehicle usage needs in a more complicated charging environment (e.g. multiple charging locations, dynamic rates, etc.).

Prioritization of the individual routine plug-in events may further be based on future routine plug-in event metrics. That is, events that are closer in time having a higher confidence of occurrence or greater routineness value may be afforded a higher priority over events that are further out in time or carry greater speculation of occurrence (e.g., a present-day after work drive home in summer traffic may carry higher priority than an upcoming Saturday morning drive to an exercise facility).

According to some examples, a plug-in routine coupled with a target SOC for each routine plug-in event along the routine represents a preferred charging schedule 226. In some specific examples, the confidence interval associated with an upcoming routine plug-in event is used to determine whether the plug-in event is included in the upcoming plug-in routine.

As discussed above, the smart charging algorithm 202 or portions of the algorithm may be stored on a server external to the vehicle. Any portion of the clustering analysis subroutine 212, routine location finder subroutine 214, departure time calculation subroutine 216, energy prediction subroutine 218, optimization subroutine 220, and/or the generation of the preferred charging schedule 226 may be performed by processors external to the vehicle, for example, a central fleet server that collects aggregate data from a plurality of vehicles to enhance the confidence of the output of any of the subroutines. In other examples, portions of the smart charging algorithm 202 are performed by a processor located at a charging station. In this case the charge station may influence and/or control charging events based on data transmitted from the vehicle or other sources.

Figure 3:
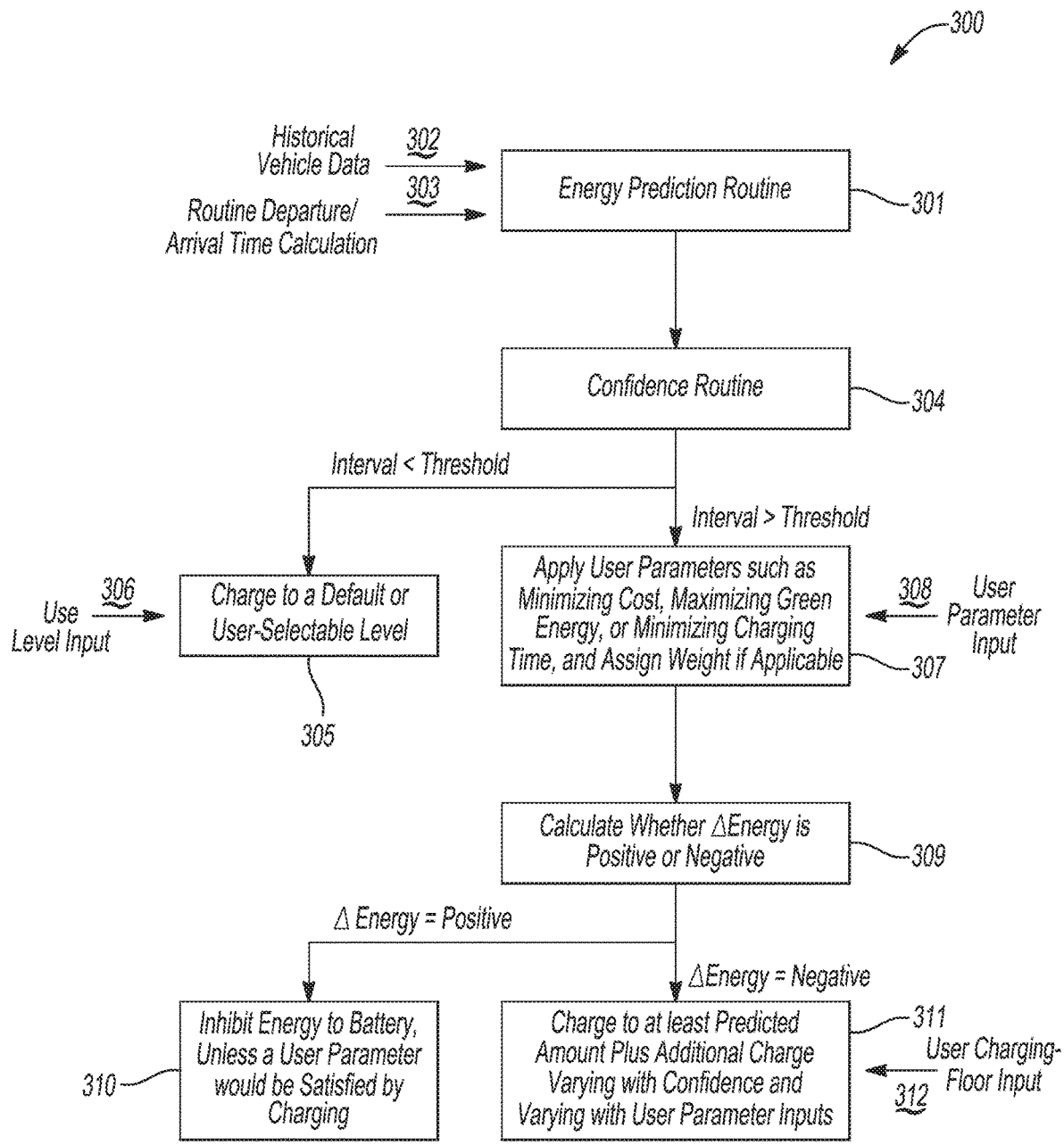
FIG. 3 is a controller system for use with a smart charging system

Referring to FIG. 3, a schematic system diagram represents an example architecture for a controller system 300 for use in the smart charging system (SCS) 200. The controller system 300 begins with an energy prediction routine 301. The energy prediction routine 301 takes several inputs: historical data 302 from the vehicle 100 and a routine departure and arrival time calculation 303 from the routine location finder 214. The energy prediction routine 301 uses these inputs to predict net energy consumption between a current charge location and the subsequent charge location using known statistical or machine learning methods.

After predicting future energy consumption, the controller system 300 conducts its confidence routine 304. In the confidence routine, the controller system 300 calculates an interval defining a confidence level that a predicted net change in energy stored by the traction battery 124 will occur as a result of use of the vehicle 100 between a current charge location of the vehicle 100 and a next charge location of the vehicle 100. If the interval is less than a predefined threshold 305 (e.g., 60%, the controller system 300 will charge the traction battery 124 to a default (e.g., maximum) level or user-selectable level 306. If the interval is greater than the predefined threshold 307, the controller system may accept parameter inputs 308 from the user. The parameter inputs that the user may enter include a preference for green energy, a preference to minimize cost, and/or a preference to minimize charge time. The user may either enter one unweighted parameter for the controller system 300 to prioritize, or the user may enter several weighted parameters for the controller system 300 to prioritize, assigning weights corresponding with importance to the user.

In addition to predicting energy consumption and calculating a confidence interval, the controller system 300 also calculates whether the predicted energy consumption between the current charge location and the next charge location is positive (a net gain in energy) or negative (a net loss in energy) 309. If the change in energy is positive 310, the controller system 300 inhibits energy to the traction battery 124 unless a direct user parameter 308 would be satisfied by charging, in which case the controller system 300 would still charge the battery to a predefined threshold. For example, if the traction battery 124 has a low current charge and is only expected to have a slightly positive net energy gain between a current charge location and a next charge location, the controller system 300 may still charge the traction battery 124 at the current charge location to take advantage of parameters such as minimizing energy cost.

If the change in energy is negative 311, the traction battery 124 will be charged such that the traction battery 124 acquires energy in an amount at least equal to the predicted net change in energy. This ensures that the vehicle 100 will at least have sufficient energy to arrive at the next routine charge location. Here, the amount is based on the interval such that the amount increases as the interval decreases. The amount of charging performed, for example, may be greater if the interval is 65% than if the interval is 90%. Likewise, the amount of charging performed may be less (but still at least equal to the predicted net change) if the interval is 85% than if the interval is 70%.

In other examples, the energy cost at the current and next routine charge location may be considered in determining the extent by which to charge the traction battery 124. If for example, the cost per unit energy to charge is more at the current location than at the next predicted routine charge location, the traction battery 124 may be charged with an amount at least equal to the predicted net change in energy. If the cost per unit energy to charge is less as the current location than at the next predicted routine charge location, the traction battery 124 may be charged with a default (e.g., maximum) amount.

Whether the energy is green (renewable: solar, wind, etc.) may also be considered. If for example, the energy at the current location is from a fossil fuel source and the energy at the next predicted routine charge location is from a green source, the traction battery 124 may be charged with an amount at least equal to the predicted net change in energy. If the energy at the current location is from a green source and the energy at the next predicted routine charge location is from a fossil fuel source, the traction battery 124 may be charge with a default amount.

If in addition to the change in energy being negative 311 parameter inputs 308 are entered by the user, the user parameters may also be used to calculate the amount of charge given to the traction battery 124. If the user selects one unweighted parameter for the controller system 300 to prioritize, the controller system 300 will charge the traction battery 124 to a predefined threshold when the parameter is satisfied. If the user selects several weighted parameters for the system to prioritize, the amount of energy that the controller system 300 provides to the traction battery 124 will vary directly with the weight of parameter when each parameter is satisfied. In some examples, a charging floor 312 could also be entered such that the traction battery at least is charged to this level.

Additionally, the controller system 300 may also calculate a second interval, defining a confidence level that a second predicted net change in energy stored by the traction battery 124 will occur as a result of use of the vehicle 100 between a current charge location of the vehicle 100 and a third charge location of the vehicle 100 after the next charge location. When this second interval exceeds a predefined threshold and the controller system 300 calculates that the traction battery 124 has capacity to supply the vehicle 100 with enough energy to get from the current charge location to the third charge location, the controller system 300 may over-ride other controller responses to satisfy a parameter input 308 by the user. For example, if a user prioritizes minimizing energy cost by selecting the corresponding parameter input 308, and the current charge location is less expensive than the next charge location but more expensive than a third charge location after the next, the controller system 300 may utilize capacity in the traction battery 124 to prioritize low-cost charging at the third charge location.

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery; and
    a controller programmed to,
        responsive to (i) a confidence level, that a predicted net change in energy stored by the traction battery will occur as a result of use of the vehicle between a current charge location of the vehicle and a next charge location of the vehicle, exceeding a predefined threshold and (ii) the net change being negative, charge the traction battery such that the traction battery acquires energy in an amount at least equal to the predicted net change in energy, wherein the amount is based on the confidence level such that the amount increases as the confidence level decreases, and
        responsive to the confidence level being less than a second predefined threshold, charge the traction battery such that the traction battery achieves a default energy level.

2. The vehicle of claim 1, wherein the controller is further programmed to, responsive to the confidence level exceeding the predefined threshold and the net change being positive, inhibit charge of the traction battery.

3. The vehicle of claim 1, wherein the controller is further configured to receive user input specifying the default energy level.

4. The vehicle of claim 1, wherein the default energy level is a maximum allowable charge level for the traction battery.

5. A method for charging a vehicle comprising:
    by a controller,
        responsive to (i) a confidence level, that a predicted net change in energy stored by a traction battery of the vehicle will occur as a result of use of the vehicle between a current charge location of the vehicle and a next charge location of the vehicle, exceeding a predefined threshold, (ii) the net change being negative, and (iii) an energy cost at the current charge location being greater than an energy cost at the next charge location, charging the traction battery such that the traction battery acquires energy in an amount at least equal to the predicted net change in energy, wherein the amount is based on the confidence level such that the amount increases as the confidence level decreases, and
        responsive to the confidence level exceeding the predefined threshold and the net change being positive, inhibiting charge of the traction battery regardless of the energy cost at the current charge location and the energy cost at the next charge location.

6. The method of claim 5 further comprising, responsive to the confidence level exceeding the predefined threshold, the net change being negative, and the energy cost at the current charge location being less than the energy cost at the next charge location, charging the traction battery such that the traction battery achieves a default energy level.

7. The method of claim 6 further comprising receiving user input defining the default energy level.

8. The method of claim 5 further comprising, responsive to the confidence level being less than a second predefined threshold, charging the traction battery such that the traction battery achieves a default energy level.

9. A vehicle comprising:
a traction battery; and
a controller programmed to,
responsive to (i) a confidence level, that a predicted net change in energy stored by the traction battery will occur as a result of use of the vehicle between a current charge location of the vehicle and a next charge location of the vehicle, exceeding a predefined threshold, (ii) the net change being negative, and (iii) a source of energy at the current charge location being identified as fossil fuel and a source of energy at the next charge location being identified as green, charge the traction battery such that the traction battery acquires energy in an amount at least equal to the predicted net change in energy, wherein the amount is based on the confidence level such that the amount increases as the confidence level decreases, and
responsive to the confidence level exceeding the predefined threshold and the net change being positive, inhibit charge of the traction battery regardless of the sources of energy being identified as fossil fuel or green.

10. The vehicle of claim 9, wherein the controller is further programmed to, responsive to the confidence level exceeding the predefined threshold and the net change being positive, inhibit charge of the traction battery regardless of the sources of energy being identified as fossil fuel or green.

11. The vehicle of claim 9, wherein the controller is further programmed to receive user input defining a default energy level.

12. The vehicle of claim 9, wherein the controller is further programmed to, responsive to the confidence level being less than a second predefined threshold, charge the traction battery such that the traction battery achieves a default energy level.

\* \* \* \* \*